United States Patent [19]

Hammond

[11] Patent Number: 5,605,427
[45] Date of Patent: Feb. 25, 1997

[54] LEVEL GRAVITY CONVEYOR WITH GRAVITY RETURN OF TRANSFER UNITS

[76] Inventor: Theodore A. Hammond, 6233 St. Ives Blvd., Orlando, Fla. 32819

[21] Appl. No.: 88,156

[22] Filed: Jul. 6, 1993

[51] Int. Cl.[6] .............................. B65G 25/02; B60P 1/00
[52] U.S. Cl. .................. 414/276; 414/277; 414/525.9; 414/531; 198/777; 193/35 SS
[58] Field of Search .................. 198/776, 774.4, 198/774.1, 777, 774.2; 414/525.9, 531, 532, 276, 277; 193/35 SS

[56] References Cited

U.S. PATENT DOCUMENTS

| | | |
|---|---|---|
| 3,451,532 | 6/1969 | Manterfield . |
| 3,658,171 | 4/1972 | Fukada . |
| 3,777,916 | 12/1973 | Lutz . |
| 4,044,876 | 8/1977 | Hammond . |
| 4,205,740 | 6/1980 | Hammond . |
| 4,304,521 | 12/1981 | Hammond . |
| 4,466,792 | 8/1984 | Ballabene et al. . |
| 4,673,326 | 6/1987 | Halonen et al. . |
| 4,684,311 | 8/1987 | Dickson-Wright et al. . |
| 4,723,909 | 2/1988 | Rouvet . |
| 4,759,676 | 7/1988 | Hammond . |
| 4,787,803 | 11/1988 | van Elten et al. . |
| 4,793,472 | 12/1988 | Solund . |
| 5,038,920 | 8/1991 | Nelson . |
| 5,064,046 | 11/1991 | Janotik et al. ............. 193/35 SS |
| 5,123,517 | 6/1992 | Windau ........................ 414/276 |
| 5,201,400 | 4/1993 | Abe ............................. 198/777 |
| 5,228,819 | 7/1993 | Hammond . |

FOREIGN PATENT DOCUMENTS

| | | | |
|---|---|---|---|
| 8702129 | 4/1989 | Netherlands ................ 414/531 |
| 518428 | 7/1976 | U.S.S.R. ..................... 414/525.9 |
| 2041321 | 9/1980 | United Kingdom ......... 414/525.9 |

*Primary Examiner*—David A. Bucci
*Assistant Examiner*—R. B. Johnson
*Attorney, Agent, or Firm*—Flynn, Thiel, Boutell & Tanis, P.C.

[57] ABSTRACT

A level gravity conveyor provides a plurality of individual load-engaging support pads aligned longitudinally along the conveyor. The pads are movably supported on runway segments which extend longitudinally. Each runway segment defines an upper raceway surface which movably supports the pad, which upper surface in the preferred embodiment is defined by a plurality of support rollers. The runway segments are alternately raised and lowered so that, when in a raised position, the upper surfaces slope downward in the forward direction. The pads engage and vertically lift the loads when the runway segments are in the raised position, whereby the weight of the loads causes the pads to move downwardly by gravity along the inclined upper surfaces to forwardly advance the loads through a small distance. When the runway segments are lowered so that the pads disengage the loads, the upper raceway surfaces slope downwardly in the upstream direction to cause gravity-induced return movement of the pads to their original upstream positions.

15 Claims, 7 Drawing Sheets

LEVEL GRAVITY CONVEYOR WITH GRAVITY RETURN OF TRANSFER UNITS

FIELD OF THE INVENTION

This invention relates to a gravity-type transporting or conveying system, such as for use in a storage rack arrangement, and more particularly to a system which extends horizontally between input and output ends but permits gravity-induced advancing of loads therealong.

BACKGROUND OF THE INVENTION

My earlier U.S. Pat. Nos. 4,205,740, 4,044,876, 4,304,521 and 4,759,676 disclose pulsating gravity-type conveyors which are particularly desirable for conveying palletized loads, and which are also highly desirable for use in storage rack systems for permitting "first in-first out" storage of palletized loads. In this known conveyor or storage rack system, the loaded pallets are supported directly on conveyor rollers, which rollers are disposed in longitudinally adjacent relationship and are supported by a carriage or rail structure which enables the rollers to vertically reciprocate in a cyclic or repetitive manner. This arrangement physically causes the palletized loads to be intermittently lifted and lowered relative to a longitudinally-extending stationary brake which extends at a slight decline relative to the horizontal. The pallets are stopped by the brake when the pallets and rollers are in their lowered positions, whereas the slope of the roller arrangement enables limited gravity-induced forward advancing of the pallets when the rollers are in their raised positions.

While the known arrangement described above has proven highly successful for transporting and storing palletized loads, particularly in storage rack arrangements, nevertheless in some storage racks spacial or size requirements prevent maximizing the number of vertically stacked bays, or the use of long bays. For example, with known gravity-type systems of the type described above, the slope of the conveyor as it extends longitudinally along the bay typically involves a vertical drop of about six inches for each ten feet of horizontal conveyor length. Since such conveyors when incorporated into storage racks typically extend from a minimum length of about 40 feet to a maximum length of as much as 200 feet, the vertical drop over such lengths can vary from as little as about two feet to about ten feet. Because of this vertical drop, when several bays each incorporating a conveyor are stacked vertically on top of one other, the number of stacked bays is limited not only by the height limitation of the building, but also by the vertical drop caused by the slope of the conveyor. Thus, optimum utilization of available space, particularly vertical height, cannot always be achieved.

To improve upon arrangements of the type described above, my copending U.S.A. Ser. No. 07/859,221, now U.S. Pat. No. 5,228,819, illustrates therein a gravity-type conveyor or transporter which permits gravity-induced advancing of loads in a steplike manner horizontally along the transporter between input and output ends thereof, which transporter itself extends horizontally between the input and output ends. In this latter arrangement, the transporter is provided with a plurality of raceway elements which are aligned horizontally of the transporter and define sloped surfaces thereon which decline in the forward direction, with each sloped surface having a pad unit movably disposed thereon. The pad units in turn are adapted to engage loads, such as palletized loads, which are moved horizontally along the transporter. During upward lifting of the raceway elements, the pads engage the loads and lift them upwardly away from a support surface, whereupon gravity causes the loads and pads to move forwardly and downwardly along the sloped surfaces until the loads reengage the support surface. During subsequent lowering of the raceway elements, the pads disengage the loads and are spring urged rearwardly and upwardly along the incline so as to be positioned for reengaging loads during the next upward lifting of the raceway elements. The loads are thus intermittently engaged and gravity-moved forwardly in a steplike manner. With this arrangement, however, return movement of the pads upwardly along the inclined surfaces is effected by some type of driving device, such as springs. While the arrangement described above provides a desirable function and structure, nevertheless the present invention is believed to represent an improvement thereover by simplifying the overall structure and operation, while at the same time provide the same steplike gravity-induced horizontal advancing movement of loads.

Summarizing the invention, in a preferred embodiment thereof, the improved level gravity conveyor arrangement provides a plurality of individual load-engaging support pads disposed in generally aligned relationship longitudinally along the conveyor. The pads are movably supported on a series of runway segments which also extend longitudinally of the conveyor. Each runway segment defines thereon an upper raceway surface which movably supports the pad, which upper surface in the preferred and illustrated embodiment is defined by a plurality of support rollers mounted in longitudinally spaced relationship on the respective runway segment. The runway segments are alternately raised and lowered so that, when in a raised position, the upper surfaces slope downward in the forward direction. The pads engage and vertically lift the loads when the runway segments are in the raised position, whereby the weight of the loads causes the pads to move downwardly by gravity along the inclined upper surfaces to forwardly advance the loads through a small distance until the loads reengage a stationary support or brake surface. When the runway segments are lowered so that the pads disengage the loads, the pads are returned rearwardly along the raceway surfaces (that is, along the rollers) to their original position. The runway segments during raising and lowering are supported for angular displacement generally within a vertical plane which extends longitudinally of the conveyor so that, when in the lowered position, the upper raceway surface slopes or declines downwardly in the upstream direction to cause gravity-induced return movement of the pads to their original upstream positions. The runway segments are normally periodically raised and lowered in a cyclic manner to effect forward steplike advancing of the loads longitudinally along the conveyor.

In this improved conveyor arrangement, in the preferred embodiment, the conveyor is associated with a storage rack so that the conveyor arrangement is supported on a frame structure having supporting flanges which define the support or brake surface for palletized loads, with these flanges extending generally horizontally between opposite ends of the conveyor. When the runway segments are raised by a lifting device, such as an inflatable hose, the pads lift the loads upwardly away from the supporting flanges, whereby the weight of the loads causes the pads to move downwardly by gravity along the sloped raceway surfaces so that the loads are horizontally forwardly advanced a small amount until the loads again contact the supporting flanges. When the runway segments are lowered, the pads disengage the loads and are moved downwardly by gravity along the downwardly inclined raceway surfaces back to the upstream end of the individual runway segments so as to be positioned for engagement under the loads during the next lifting cycle.

With the improved arrangement of the present engagement, as briefly summarized above, both forward advance of the loads and return movement of the load-transfer pads occurs by gravity in a safe and controlled manner, and the overall structure can be simplified by not requiring any type of powered device such as springs or the like for returning the pads to the upstream positions. At the same time the overall transporter still retains its horizontal characteristics in that the conveyor still extends horizontally between the input and output ends and permits a maximum number of such conveyor units to be vertically stacked one above another within a storage rack while occupying a minimum overall vertical height.

The overall arrangement of this improved conveyor, briefly summarized above, is also desirable in that the support rollers are mounted on the runway segments and rollingly engage a downwardly-facing or bottom surface defined on the pads, which surface is generally protected due to its downwardly-facing orientation and prevents accumulation of dirt and contaminates thereon so as to maintain proper rolling engagement between the pads and rollers to provide for a more maintenance-free arrangement. The structural connections and cooperations of this improved conveyor also provide for increased simplicity of manufacture and assembly.

Other objects and purposes of the present invention will be apparent to persons familiar with this area of technology upon reading the following specification and inspecting the accompanying drawings.

Figure 1:
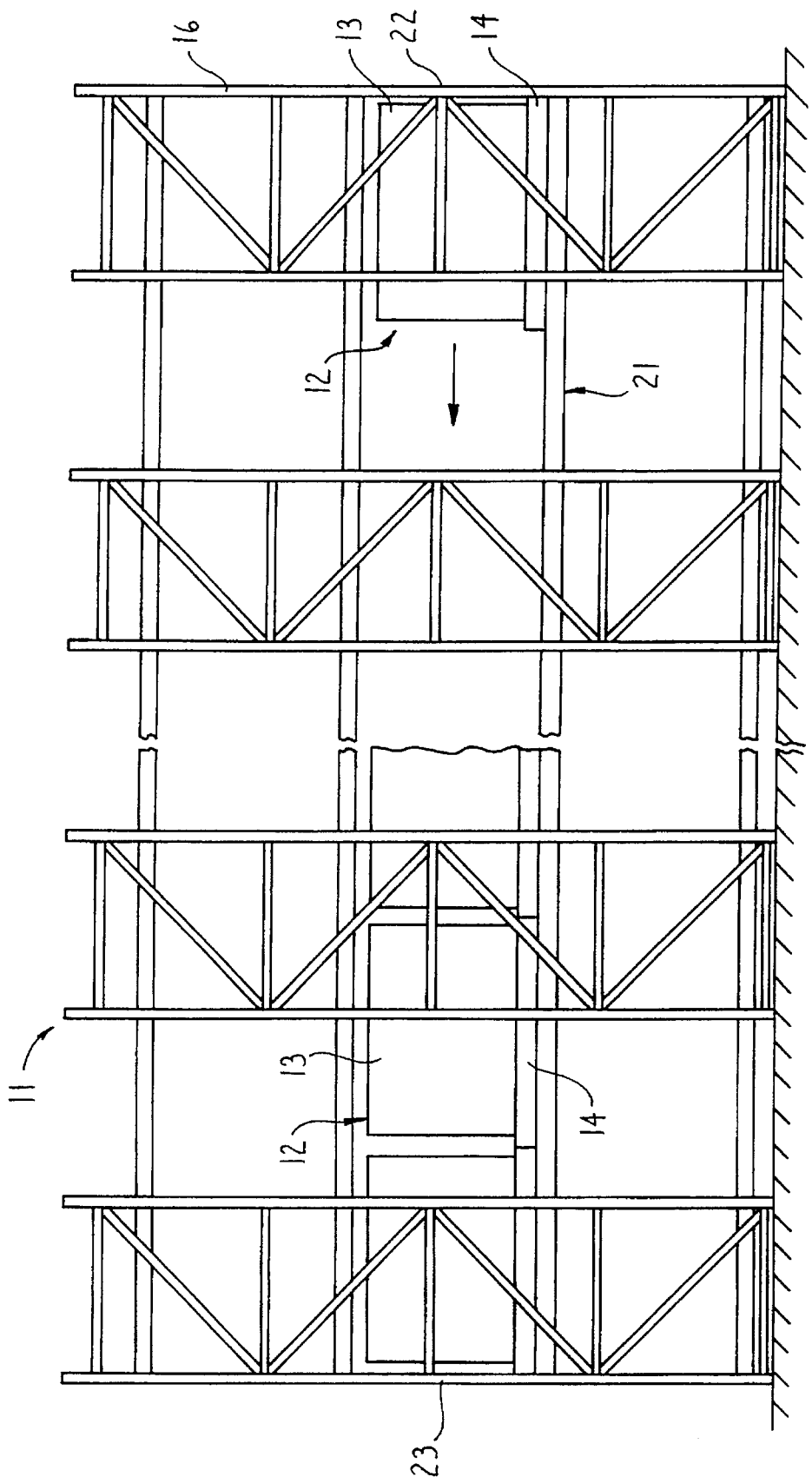
FIG. 1 is a side elevation view of a typical storage rack modified to include the conveyor of the present invention associated with the individual bays.

Certain terminology will be used in the following description for convenience in reference only, and will not be limiting. For example, the words "upwardly", "downwardly" "rightwardly" and "leftwardly" will refer to directions in the drawings to which reference is made. The word "forwardly" will refer to the normal direction of movement of a load along the conveyor, which direction for example is rightwardly in FIGS. 4 and 5. The words "inwardly" and "outwardly" will refer to directions toward and away from, respectively, the geometric center of the system and designated parts thereof. Said terminology will include the words specifically mentioned, derivatives thereof, and words of similar import.

DETAILED DESCRIPTION

Figure 2:
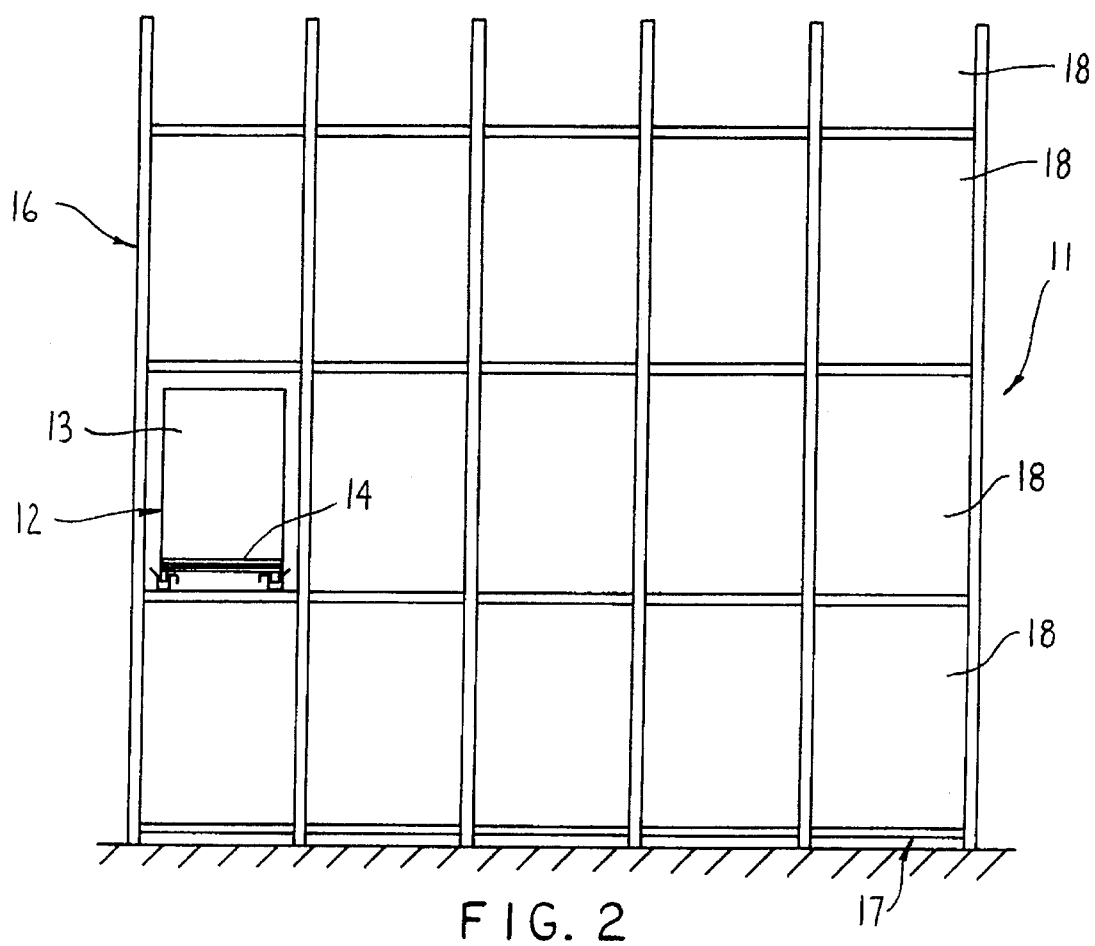
FIG. 2 is an end elevational view of the storage rack which is diagrammatically illustrated by FIG. 1.

FIGS. 1 and 2 illustrate a storing and transporting rack system 11 designed specifically for handling and storing palletized loads 12, which loads in the illustrated embodiment comprise suitable articles or goods 13 stacked on conventional pallets 14. The storing and transporting system 11, in a preferred embodiment, incorporates a rack-type framework 16 which includes a plurality of horizontally adjacent columns 17, each including a plurality of bays or tiers 18 disposed vertically one above the other. Each bay has a gravity-type conveyor or transporter 21 associated therewith and extending longitudinally along the framework from an input end 22 to an output end 23. The conveyor or transport 21 is designed to provide for "first in-first out" storage of palletized loads.

The conveyor or transporter 21, in this illustrated embodiment, includes a pair of generally parallel, sidewardly-spaced, horizontally elongate support rails 24 (FIG. 3) which extend longitudinally between the input and output ends of the respective bay. These support rails are identical except for being mirror images of one another, and are suitably fixedly secured to and supported on appropriate transverse frame members 19 associated with the framework 16. The support rails 24 extend horizontally throughout the length thereof between the input end 22 and the output end 23. That is, the support rails are not inclined or sloped, and thus the input and output ends 22 and 23 are at the same elevation.

Each support rail 24 includes a generally upwardly-opening, U-shaped channel defined by a substantially horizontal bottom wall 25 which fixedly and rigidly joins to the bottom edges of a pair of upwardly projecting and sidewardly-spaced side walls 26. The channel defines therein a horizontally elongated channel-like space 27 which opens upwardly. Each side wall 26 has a flange 28 fixed to the upper edge thereof, which flange extends horizontally along the entire length of the support rail and projects horizontally sidewardly in an outward direction (that is, away from the channel-like space 27). The pair of flanges 28 project sidewardly in opposite directions from the upper edges of the channel member 24, and define thereon upper horizontally-extending surfaces 29 which function as support or brake surfaces for engagement with the underside of the pallets 14. These surfaces 29 define a horizontal support plane 31 for the loads. The outermost flange 28, adjacent its outer edge, is also rigidly joined to an edge flange 32 which slopes upwardly at an angle of about 45° as it also projects further outwardly. The pair of edge flanges 32 as defined on the pair of support rails 24 are hence disposed outermost and function both to sidewardly confine the pallet 14 therebetween, and to effect sideward recentering of the pallet during lowering thereof.

Each of the support rails 24 mounts therein a load-advancing arrangement 33, as explained below, which extends longitudinally throughout the length of the respective support rail 24 and is adapted to provide for a gravity-induced incremental or steplike forward advancing movement of the loads 12 from the input end 22 toward the output end 23 of the bay 18.

The load-advancing arrangement 33 includes an elongate track or runway structure 34 which is horizontally elongated and extends throughout substantial the entire horizontal length of each of the support rails 24. This runway structure 34 is positioned within the channel-like space 27 and is supported on the respective support rail 24 so as to permit limited vertical displacement therebetween, while being restrained from horizontal movement along the rail 24, as explained below.

More specifically, the runway structure 34 is defined by a plurality of load-advancing modules or segments 35 (FIGS. 4 and 5) which are individually of short longitudinal length, with a large plurality of such modules 35 being generally positioned in adjacent end-to-end relationship within the respective support rail 24 throughout the longitudinal length thereof. Each of the modules 35 is individually vertically movable.

Each module 35 comprises a generally upwardly-opening channel-like housing 36 (FIG. 6) defined by a bottom wall 37 joined to lower edges of upwardly projecting and generally parallel side walls 38, which walls cooperate to define therein a generally upwardly-opening channel-like space 39. This housing 36 mounts thereon a plurality of freely-rotatable cylindrical rollers 41 which are rotatably supported on axles 42 which extend perpendicularly between and are mounted on the side walls 38 adjacent the upper edges thereof. The rollers 41 are disposed so as to be positioned generally within the channel-like space 39 with the rollers 41 projecting upwardly out of this space. Several such rollers 41 are disposed longitudinally along the housing 36.

The module 35 also includes a load-engaging pad unit 44 (FIGS. 4–6) which includes a platelike load-engaging top pad 45 disposed generally above the rollers 41 and having a generally planar or flat bottom surface 46 which is disposed in rolling engagement with the uppermost extremities of the rollers 41. These rollers 41 at the uppermost contact points define a generally tangential contact or raceway surface 47 which is coextensive with the bottom surface 46 of the pad 45. The top pad 45 also defines thereon an upper surface 48 which is generally relatively flat and is adapted to be disposed in supportive engagement with the underside of the load, such as the bottom of a pallet 14.

The pad unit 44 also has a pair of side legs 49 which are fixed to and project downwardly from opposite sides of the top pad 45, with these side legs 49 effectively sidewardly straddling the rollers 41. The side legs 49 also sidewardly straddle elongate securing members 52 which are fixed to the outer sides of the side walls 38 and project upwardly therefrom. These securing members 52 are fixed to the respective side walls 38 by suitable fasteners such as bolts or the like, and extend lengthwise of the housing 36 over substantially the full longitudinal length thereof. The securing members 52 are cantilevered upwardly and, at upper longitudinally-extending edges thereof, are provided with inwardly projecting guide flanges 53 which project into and are slidably confined by guide grooves 51 formed in the side legs 49 of the pad unit 44. The grooves 51 extend longitudinally throughout the length of the pad side legs, and open horizontally sidewardly so as to longitudinally slidably accommodate therein the respective flanges 53. This cooperation between the grooves 52 and flanges 53 retains the pad unit 44 to the housing 36, but permits the pad unit 44 to be linearly moved lengthwise of the housing in parallel relationship to the support plane 47.

The movement of the pad unit 44 relative to the respective housing 36 is limited by suitable stops or flanges (not shown) which are provided adjacent opposite ends of the securing members 52 and which project inwardly so as to be disposed in the path of travel of the pad unit to limit the travel thereof.

Figure 4:
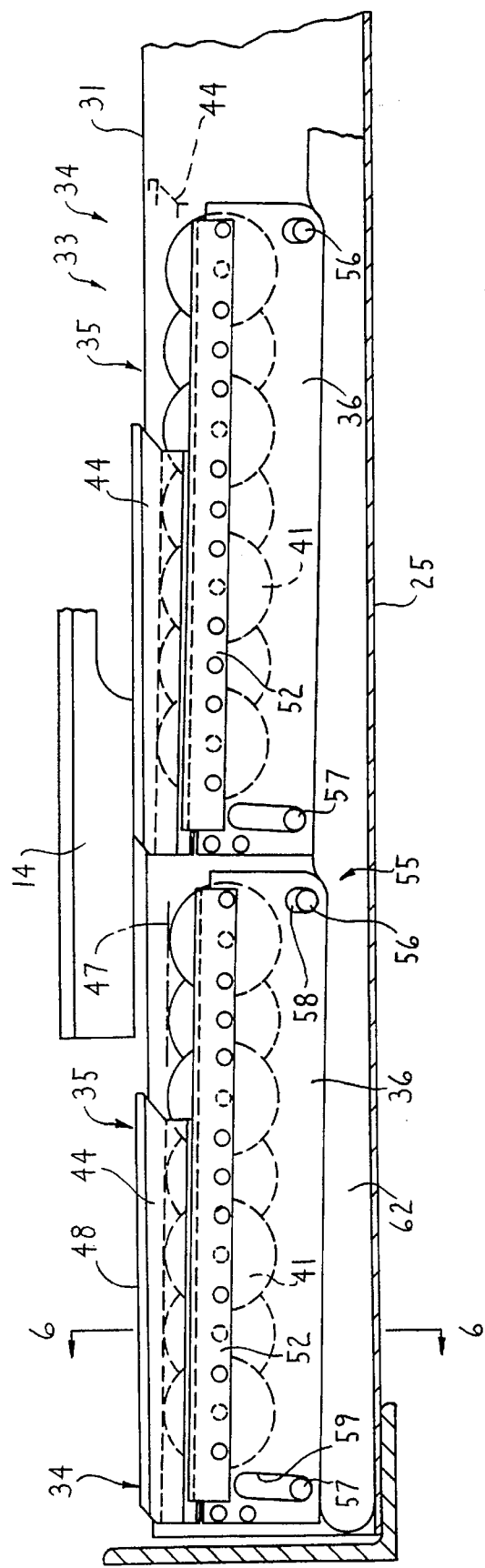
FIG. 4 is an enlarged fragmentary side elevational view which diagrammatically illustrates, in the longitudinal extent, two adjacent runway segments of the improved gravity-type conveyor of the present invention in the raised or conveying position.
Figure 5:
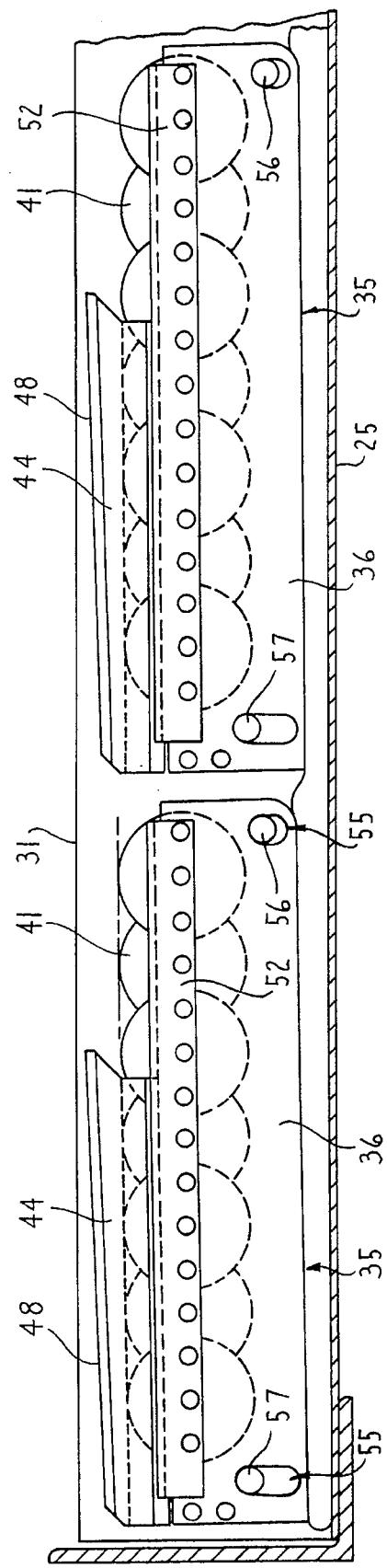
FIG. 5 is a view similar to FIG. 4 but illustrating the runway segments in the lowered or nonconveying position.
Figure 6:
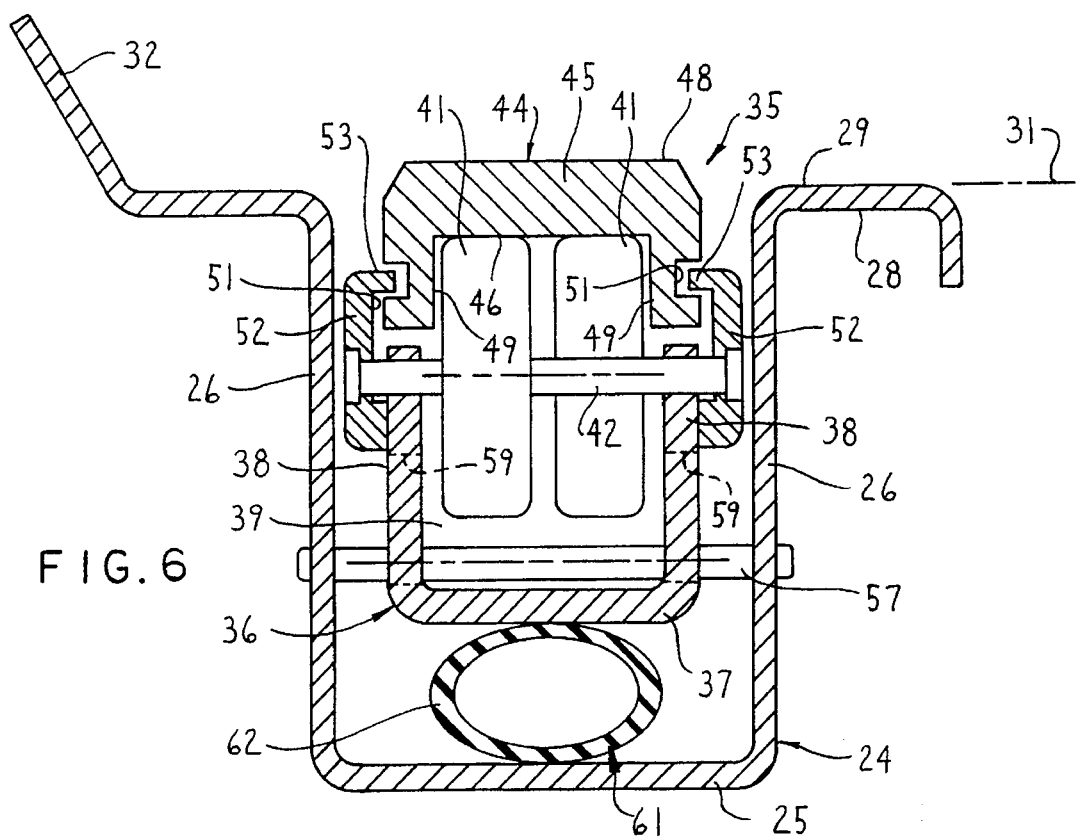
FIG. 6 is an enlarged cross sectional view taken substantially along line VI—VI in FIG. 4.

To permit each runway module 35 to have controlled vertical movement relative to the respective support rail 24, the housing 36 of each module is coupled to the respective support rail 24 by a vertical motion limiting means 55 (FIGS. 4 and 5). This latter means includes front and rear pins 56 and 57 which are associated with each module 35. These pins 56 and 57 are secured to and extend generally perpendicularly between the opposite side walls 26 of the support rail 24. More specifically, the rear pin 57 is fixed to and extend perpendicularly between the side walls 26 of the support rail 24, as shown in FIG. 6, and projects through vertically elongate rear slots 59 formed in the side walls 38 adjacent the rear or upstream end of the housing 36 as shown in FIGS. 4 and 5. In similar fashion the front pin 56 extends through vertically elongate front slots 58 which are formed through the side walls 38 of the housing 36 adjacent the front or downstream end thereof, with the ends of pin 56 being fixed to the side walls 26. The slots 58 and 59 have a width which typically only slightly exceeds the diameters of the respective pins 56 and 57, but the slots have a vertical length which significantly exceeds the pin diameter so as to permit vertical displacement of the housing 36 relative to the support rail 24.

The slots 58 and 59 are both closed at the upper and lower ends thereof so as to captivate the module housing 36 within the support rail 24. However, the rear slot 59 has a vertical length which is significantly greater than the vertical length of the front slot 58 so as to permit the rear (i.e., upstream) end of the module housing 36 to be vertically displaced relative to the support rail 24 through a significantly greater extent than is possible adjacent the front (i.e., downstream) end of the module housing. In fact, the permissible vertical displacement of rear pin 57 within rear slot 59 is normally at least about twice, and in a preferred embodiment about three times, the vertical displacement permitted by the front slots 58 and their cooperation with the front pin 56.

The load-advancing arrangement 33 also includes a reciprocating vertical lifting means 61 (FIGS. 3–6) which cooperates between the support rail 24 and the respective runway structure 34 so as to effect cyclic raising and lowering of the runway structure. This vertical lifting means 61, in the illustrated and preferred embodiment, includes an elongate gas (i.e., air) inflatable hose 62 (such as a fire hose) disposed within the bottom of each support rail 24 and extending longitudinally throughout the entire horizontal extent thereof. This inflatable hose 62 is normally supported directly on the bottom wall 25 of the support rail and in turn supports thereon the flat bottom wall 37 associated with the housing 36 of each module 35.

The inflatable hose 62 is connected to a suitable power source (not shown), such as an air compressor, the latter being activated and regulated by a suitable control unit (not shown) so that the hose 62 can be cyclically inflated and deflated in an intermittent yet regulated manner, such as for example approximately 15 to 25 cycles per minute, whereby the load-advancing modules 35 are cyclically raised and lowered in a reciprocating and repetitive manner relative to the support rails 24 at a rate corresponding to the pulse rate of the hose 62. The control arrangement for effecting repetitive inflation and deflation of the hose is conventional, whereby further description thereof is believed unnecessary.

Figure 7:
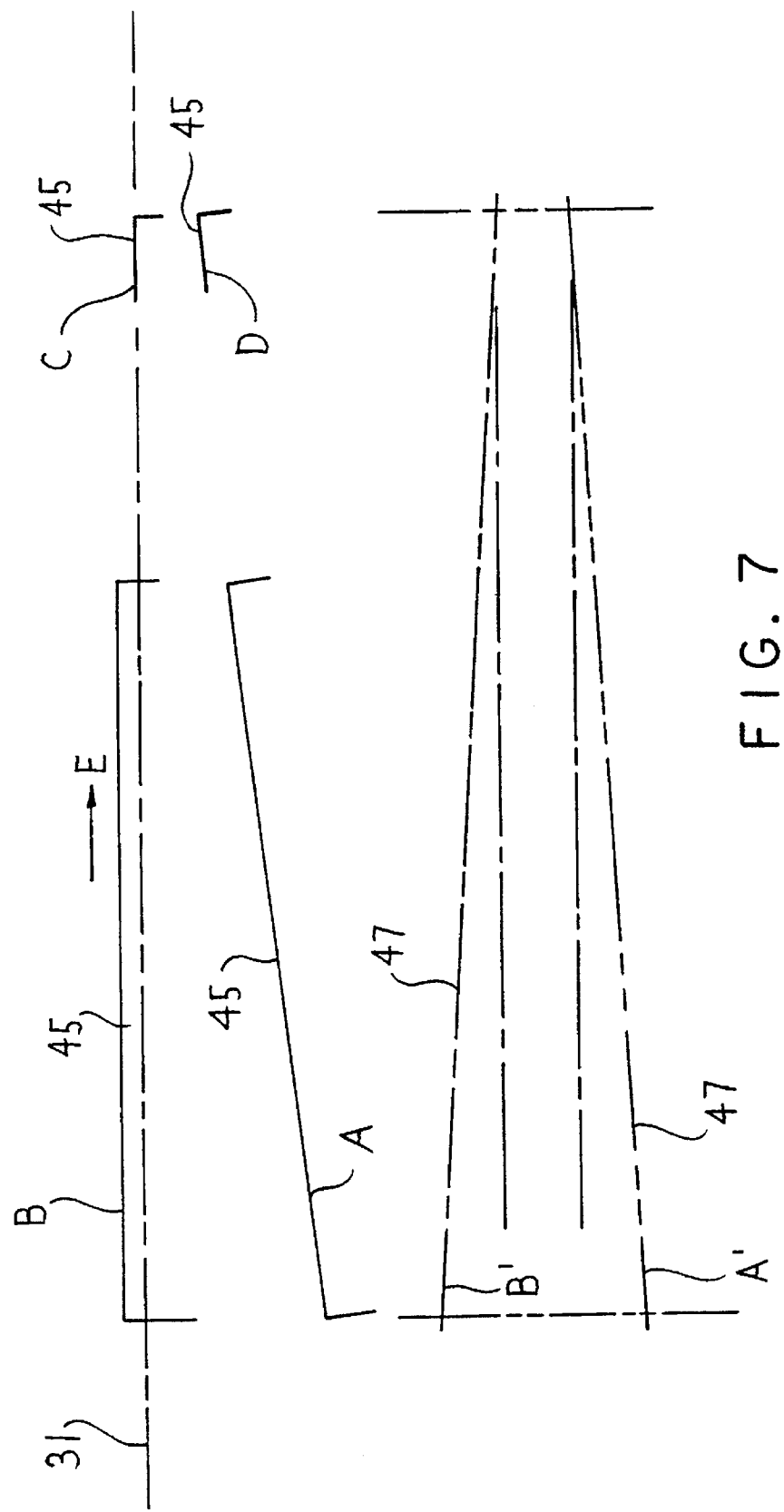
FIG. 7 is an enlarged diagrammatic view, in the longitudinal direction of the conveyor, illustrating a single runway segment and the positions assumed thereby.

The operation of the arrangement of FIGS. 3–6 will now be briefly described, and reference will also be made to FIG. 7 which diagrammatically illustrates the positional relationship of the raceway module 35 relative to the respective support rail 24. Due to the cooperation of the vertical motion limiting means 55 (namely the pins 56–57 and slots 58–59), each module 35 can be moved between a lowered position when the hose 62 is at least partially deflated and a raised position due to inflation of the hose. In the raised position, the module 35 is in a load-conveying or load-advancing orientation, whereas in the lowered position the module is in a nonconveying or nonadvancing position. In movement of the module between the raised advancing position and the lowered nonadvancing position, the entire module 35 undergoes, in its entirety, not only a vertical translation relative to the support rail 24, but also undergoes a vertical angular displacement relative to the support rail 24 due to the difference in length between the slots 58 and 59.

When the module 35 is in the lowered or nonadvancing position, the hose 62 is at least partially deflated and the module housing 36 is thus vertically supported on the respective pins 56 and 57, which pins engage the upper ends of the respective slots 58 and 59. Due to the relative positional relationships of these pins and slots, this results in the module housing 36 being angled slightly downwardly relative to the horizontal as the housing projects in the upstream direction. Thus, the raceway surface 47 defined by the rollers 41 is also slightly downwardly inclined as it projects in the upstream direction as indicated by the dash-double dot line $A^1$ in FIG. 7. Due to this downward inclination of the plane of the surface 47, the respective pad unit 44 tends to roll downwardly by gravity along this plane surface 47 until abutting the stop which holds the pad unit at the rear or upstream end of the module housing, whereby the top pad 45 is disposed at position A substantially as illustrated by solid lines in FIG. 7 and is disposed below the plane 31.

However, when the hose 62 is inflated, it lifts the entire module 35 upwardly as permitted due to the cooperation between the pins and slots, which upward lifting is limited by the pins 56–57 engaging the lower ends of the respective slots 58–59, thereby defining the raised or load-advancing position of the module 35, substantially as illustrated by position B of the top pad 45 in FIG. 7. Again due to the orientation of the pins 56–57 and slots 58–19 and the extra vertical length of the rear slots 59, the housing module is oriented such that the support surface or raceway plane 47 defined by the upper tangential points of the rollers 41 declines downwardly at a small angle as it projects in the forward or downstream direction, as shown by dash-dot line $B^1$ in FIG. 7. When in this raised position, and with the pad unit 44 disposed at the upstream end of the module, this results in the upper surface of the top pad 45 being disposed slightly upwardly above the horizontal load support plane 31. This causes the top pad 45 to engage the bottom of the load during vertical raising of the module, with the pad lifting the load upwardly away from the support surface 31 as the module is raised into the uppermost position (i.e. rearward position B in FIG. 7). This raises the load upwardly out of engagement with the surface 31 whereby the pad unit 44, due to the effect of gravity, rolls forwardly (in the direction of arrow E) and downwardly along the shallow decline defined by the roller contact plane 47 (i.e. position B' in FIG. 7) toward forward position C. The pad unit 44, and the load carried thereby, is thus forwardly advanced a small extent horizontally in the forward direction E along the conveyor, which forward advancing movement continues only over a relatively small distance since the downward decline of the pad as it forwardly advances ultimately results in the load being brought back into supportive engagement with the support plane 31 defined by the flanges 28. This will normally occur as the pad 45 closely approaches the downstream end of the respective housing 36.

After the pad 45 moves forwardly when in the raised position so as to forwardly advance the load through a steplike distance, such as to position C, then the hose 62 is again partially deflated, thereby returning the module to the lowered position. During the initial lowering, however, the pad unit is still adjacent the forward or downstream end of the module housing. This lowering results in the upper surface of pad 45 being lowered to a point slightly below the support plane 31 (see position D in FIG. 7), and this coupled with the greater lowering of the upstream end of the module housing as permitted by the slots 59, restores the roller contact plane 47 to the rearward position $A^1$ whereby it is declining as it projects upstream (leftwardly in FIG. 7). The pad unit 44, being free of contact with the load, is free to roll under the urging of gravity downwardly along the defining plane 47 (i.e. line $A^1$) so as to return to its position adjacent the upstream end of the module housing. This thus restores the module to its original lowered position (i.e. position A) so as to permit the module to carry out a subsequent cycle of operation.

In operation, a palletized load 12 is deposited on the transporter or conveyor 21 at the input end 22 thereof, such as by a forklift truck. As the hoses 62 of the transporter are cyclically inflated and deflated, the advancing arrangements 33 in the rails 24 are also cyclically raised and lowered in a repetitive fashion. During raising, the pad units 44 are moved upwardly to engage the underside of the pallet 14 (preferably a minimum of two or three pad units will be engaged with each pallet) to lift the pallet upwardly a small distance above the support surface 31. The weight of the pallet then causes the pad units 44 to roll forwardly by gravity along the downwardly inclined roller contact plane 47, thereby forwardly advancing the pallet through a small steplike distance which may be in the order of about three inches. The forward advancing of the pallet, due to rolling engagement between the rollers 41 and the bottom surface 46 of the pad unit, continues either until the declining movement of the pad unit causes the pallet to reengage the support surfaces 29, or until the hoses 62 are deflated and lower the pallet back into engagement with the support surfaces 29.

Once the hoses 62 are deflated and the pallet 12 repositioned on the support surfaces 29, the continued deflation of the hoses effects further lowering of the module housing 36 and associated pad unit 44 downwardly away from the underside of the pallet, and results in the roller contact plane 47 now being reversely inclined relative to the support plane 31, that is, the roller contact plane 47 now declines in the rearward or upstream direction. Thus, the pad units 44 are caused to roll rearwardly by gravity along the downward incline of the roller contact plane 47 until reaching their upstream positions, in which positions the pad units are still disposed downwardly from the support plane 31 and hence free of engagement with the pallets.

The system is thus in a position to repeat the cycle in that the hoses are again inflated so that the pad units again engage and lift the pallets upwardly away from the support surfaces and then permit a forward gravity-urged steplike advance of the pallets in the same manner as described above.

Due to the continuous cyclic pulsing of the hoses 62, and the corresponding cyclic actuation of the load-advancing arrangement 33, a palletized load can be moved forwardly along the conveyor in a steplike fashion. This forward stepping of the load will continue until the load abuts against a stationary object, such as a front stop or the next forwardly positioned pallet.

For example, if no other pallets are positioned forwardly on the conveyor, then the pallet will be moved forwardly until it contacts a stop disposed at the forward or output end of the bay. This stop will hold the pallet horizontally stationary, even though the pallet may continue to cycle up and down in response to the pulsing of the inflatable hoses. The pallet is then in a position to be removed when desired, such as by use of a forklift.

On the other hand, if several pallets are arranged in abutting contact rearwardly away from the output end of the conveyor, then pallets which are supplied to the input end will be conveyed forwardly only until they abut the next frontmost stationary pallet. However, when the frontmost pallet as disposed directly at the output end is removed, then continued cyclic movement of the advancing arrangement causes all of the pallets to advance forwardly in a steplike manner until the leading pallet again contacts the front stop.

With the arrangement of this invention, since the support rails and the conveying structures associated therewith all extend horizontally from the input end to the output end, the pallets themselves remain in a generally horizontal orientation at all times, even during the lifting and lowering thereof due to the pulsing of the hoses, and also during the forward advance thereof as the pad units move downwardly along the declining roller planes. Thus, articles or goods supported on the pallets also remain horizontal, and are not subjected to undesired tilting.

In an actual embodiment of the invention, it is anticipated that each module housing will be in the order of 10 to 12 inches long, the pad will be about 7 to 8 inches long to provide a permissible movement or stroke of about 3 inches, and the front pin-slot arrangement will provide about a ¼ inch vertical displacement whereas the rear pin-slot arrangement will provide about ⅝ to ¾ inch vertical displacement. However, the exact geometry can obviously be suitably varied depending upon the overall design of the system and the loading conditions thereof.

Figure 3:
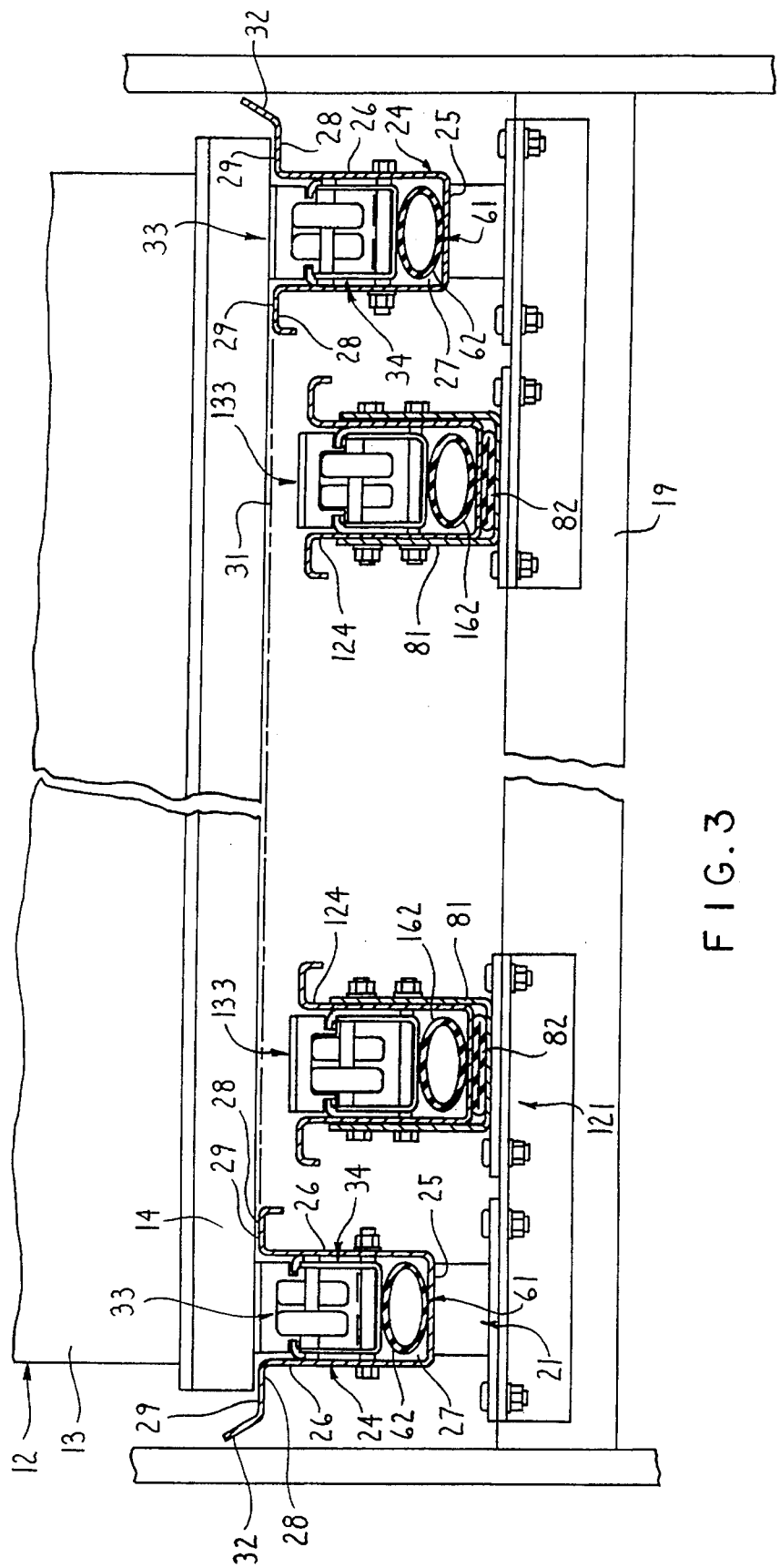
FIG. 3 is an enlarged fragmentary view which illustrates a conveyor as associated with one bay of the rack, and having a palletized load associated therewith.

Referring now to FIG. 3, there is also illustrated therein a variation of the invention wherein there is provided a further transporter or conveyor 121 defined by two stationary support rails 124 disposed so as to extend horizontally in parallel relationship to one another. These rails 124 are sidewardly spaced apart but are disposed between the rails 24 of the transporter 21. Each rail 124 again mounts therein a load-advancing arrangement 133 which is identical to the arrangement 33 except that it is reversely longitudinally oriented. That is, this reverse orientation enables the conveyor 121 to be utilized for moving loads in the opposite direction from which the loads are moved by the conveyor 21. Since the construction of this conveyor 121 is identical to that of the conveyor 21, except for the reverse longitudinal orientation thereof, no additional description thereof is believed necessary.

This conveyor 121 additionally has the support rails 124 vertically slidably confined within channel-like guide rails 81 which are fixed to the framework and extend horizontally in the longitudinal direction of the conveyor. An activating device 82, such as an inflatable gas (i.e. air) hose is interposed between the bottom walls of the rails 81 and 124. This hose 82 is normally deactivated (i.e., deflated) so as to maintain the conveyor 121 in a lowered deactivated position whereby it is free of any contact with the loads. However, when hoses 82 are activated so as to raise the conveyor 121 into a raised activated position, this positions the load-advancing arrangements 133 directly beneath the loads so that activation of these arrangements 133, such as by activation (that is, alternating inflation and deflation) of the hoses 162, is then sufficient to cause the arrangements 133 to intermittently engage and horizontally advance the loads in the reverse or return direction. This operation is thus the same as the operation of the conveyor 21 described above.

It will be appreciated that the pin-slot arrangement which couples the modules and the support rail can be reversed if desired in that the slots can be provided in the side walls of the support rail and the pins fixed to the module housings. Other types of vertical motion limiting structures or stops can also be utilized for accomplishing this same function.

While a highly preferred utilization of the improved conveyor or transporter of this invention is its incorporation into a storage rack as illustrated by FIGS. 1 and 2, it will be understood that the improved transporter could also be desirably utilized in nonstorage rack applications, such as in more conventional conveying applications.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A level gravity-type transporting apparatus for transporting loads along a predetermined direction, comprising:

a horizontally and longitudinally elongate support structure having horizontally and longitudinally spaced first and second ends, said support structure extending longitudinally parallel to the direction of load movement, said support structure extending horizontally along a longitudinal direction from said first end where loads are inputted to said second end where loads are outputted, said support structure defining an upwardly-facing and substantially longitudinally elongated support surface extending horizontally longitudinally for supportive engagement with loads;

runway means extending longitudinally of said support structure and moveable vertically relative thereto for engaging loads and effecting forward advancing movement thereof along the support structure toward said second end;

said runway means including a plurality of load-advancing modules disposed in generally adjacent and aligned relationship longitudinally along said support structure, each said module including a module housing supported for vertical movement within a vertical plane which extends in said longitudinal direction, said module housing including support means defining a generally upwardly-facing bearing surface which is generally horizontally elongated in said longitudinal direction;

each said module including a load-advancing pad unit mounted on the respective module housing and supported for movement longitudinally along said bearing surface;

positioning means cooperating with said module housing for permitting vertical displacement of the module housing between (1) a raised position and (2) a lowered position, said module housing when in said raised position being disposed so that the respective bearing surface slopes downwardly in a forward direction toward said second end, and said module housing when in said lowered position being disposed so that the respective bearing surface slopes downwardly in a rearward direction toward said first end;

said pad unit including thereon a generally upwardly-facing load-engaging surface which projects upwardly above the elongated support surface for engaging a load and lifting it upwardly from the support surface when the module housing is in the raised position, said upwardly-facing load-engaging surface being disposed generally below the support surface when the module housing is in the lowered position, said pad unit being movable forwardly by gravity along the bearing surface to effect a steplike forward advancement of the load when the module housing is in the raised position, and said pad unit being movable rearwardly by gravity along the bearing surface when the module housing is in the lowered position; and lifting means for causing raising and lowering of the modules relative to the support structure in a repetitive pattern to effect lifting of loads away from the support surface, following which the loads and the pad units which are engaged therewith are moved forwardly toward a forward position by gravity due to the pad units moving forwardly and downwardly along the respective bearing surfaces to permit a forward steplike advancing movement of the loads, followed by lowering of the modules downwardly away from the loads into the lowered position so that the pad units then move rearwardly and downwardly along the respective bearing surfaces to permit a rearward return of the pad units to a rearward position.

2. An apparatus according to claim 1, wherein said positioning means includes front and rear vertical motion limiting means cooperating between each said module housing and said support structure for limiting vertical displacement of the respective module housing between said raised and lowered positions, said rear vertical motion limiting means permitting a larger vertical displacement then said front vertical motion limiting means.

3. An apparatus according to claim 2, wherein each of said front and rear vertical motion limiting means includes a stop fixed on one of said module housing and support structure and cooperating with a vertically elongate slot formed in the other of said module housing and support structure, the slot associated with the front vertical motion limiting means being of lesser vertical length than the slot associated with the rear vertical motion limiting means.

4. An apparatus according to claim 3, wherein said support means comprises a plurality of freely-rotatable rollers disposed on said module housing for rotation about substantially horizontally axes which extend perpendicular to said longitudinal direction, said plurality of rollers being disposed in longitudinally spaced relationship so that said rollers define upper contact points thereon which are spaced longitudinally and define said bearing surface, said pad unit having a generally flat downwardly-facing surface which is engaged with said rollers at said contact points.

5. An apparatus according to claim 4, wherein said lifting means includes an elongate inflatable air hose supported on said support structure and extending longitudinally therealong beneath said module housings for effecting lifting of the module housings upon inflation of the hose.

6. An apparatus according to claim 1, wherein said support means comprises a plurality of freely-rotatable rollers disposed on said module housing for rotation about substantially horizontally axes which extend perpendicular to said longitudinal direction, said plurality of rollers being disposed in longitudinally spaced relationship so that said rollers define upper contact points thereon which are spaced longitudinally and define said bearing surface, said pad unit having a generally flat downwardly-facing surface which is engaged with said rollers at said contact points.

7. An apparatus according to claim 6, wherein said lifting means includes an elongate inflatable air hose supported on said support structure and extending longitudinally therealong beneath said module housings for effecting lifting of the module housings upon inflation of the hose.

8. An apparatus according to claim 6, wherein said pad unit includes a top pad and a pair of side leg structures which are fixed to and project downwardly from opposite sides of said top pad in sideward straddling relationship to said rollers, said side legs and said module housing having a cooperating tongue-and-groove arrangement formed thereon and extending longitudinally thereof for permitting controlled linear movement of the pad unit generally longitudinally of the respective module housing between said forward and rearward positions.

9. An apparatus according to claim 1, wherein said support structure includes a pair of generally parallel and horizontally elongated rails disposed in sidewardly-spaced relation, each of said rails being of a generally upwardly-opening channel-like configuration defined by a bottom wall and a pair of upwardly projecting side walls, said side walls at their upper edges being fixedly joined to top flanges which project outwardly generally horizontally and define thereon upper surfaces which define said support surface, said runway means including a runway assembly disposed within and extending longitudinally along each of said rails, each said runway assembly being defined by a plurality of said load-advancing modules disposed in generally adjacent and aligned relationship longitudinally along the respective rail.

10. An apparatus according to claim 9, wherein said lifting means includes an elongate inflatable air hose supported within the bottom of and extending longitudinally along each of said rails, said module housings being disposed on top of said hose so that the module housings are lifted upwardly into the raised position upon inflation of the hose.

11. An apparatus according to claim 1, including second runway means extending longitudinally of said support structure in generally parallel and sidewardly adjacent relationship to said first-mentioned runway means, said second runway means being reversely longitudinally oriented relative to said first-mentioned runway means for permitting stepwise advance of loads along said support structure toward said first end.

12. An apparatus according to claim 11, including activating means cooperating between said second runway means and said support structure for moving said second runway means from a lowered inactive position to a raised active position, and auxiliary lifting means cooperating with said second runway means when the latter is in the active position for effecting raising and lowering thereof to permit stepwise movement of loads toward said first end.

13. A level gravity-type transporting apparatus for transporting loads, such as pallets, generally horizontally along a predetermined direction, comprising:

a horizontally and longitudinally elongate stationary support structure having horizontally and longitudinally spaced first and second ends, said support structure extending longitudinally parallel to the direction of load movement, said support structure extending along a longitudinal direction from said first end to said second end and including horizontally elongate and longitudinally-extending load supporting elements which define thereon substantially horizontally and upwardly-facing load supporting surfaces;

a load-advancing means mounted on said support structure and extending generally horizontally and longitudinally from said first end to said second end for effecting steplike advancing movement of loads in a direction from said first end to said second end;

said load-advancing means including:

(a) a plurality of separate and independently movable load-advancing pad units disposed in aligned relationship generally between said first and second ends of said support structure, each said pad unit being adapted to engage and effect forward advancing movement of a load through a determined steplike distance, (b) a support housing associated with each said pad unit and movably mounting the respective pad unit thereon for permitting linear movement of the pad unit relative to the respective support housing between upstream and downstream positions which are spaced apart generally along said longitudinal direction, (c) lifting means cooperating with said support housings for effecting vertical displacement thereof between (1) a raised position wherein the pad unit when in said upstream position is at an elevation above the pad unit when in the downstream position and the pad unit engages and lifts a load upwardly from the supporting surfaces so that the pad unit and the load thereon forwardly advance by gravity toward the downstream position, and (2) a lowered position wherein the pad unit when in the downstream position is at an elevation above the pad unit when in the upstream position so that the pad unit moves rearwardly by gravity back to said upstream position.

14. An apparatus according to claim 13, wherein said lifting means effects vertical swinging of the support housing generally about a downstream end thereof during vertical lifting thereof between said raised and lowered positions so that when the support housing is in the raised and lowered positions the pad unit when in the upstream position is respectively above and below the pad unit when in the downstream position.

15. An apparatus according to claim 14, including second load-advancing means supported on and extending longitudinally along said support structure in generally parallel but sidewardly adjacent relationship to said first-mentioned load-advancing means, said second load-advancing means including means for stepwise advancing movement of loads in a direction generally horizontally toward said first end; and activating means cooperating between said support structure and said second load-advancing means for vertical movement of said second load-advancing means from a lowered position wherein said second load-advancing means is maintained in an inactive disposition and a raised position wherein the second load-advancing means can be activated to permit stepwise advancing movement of the loads toward said input end.

* * * * *

UNITED STATES PATENT AND TRADEMARK OFFICE
CERTIFICATE OF CORRECTION

PATENT NO. : 5 605 427
DATED : February 25, 1997
INVENTOR(S) : Theodore A. Hammond It is certified that error appears in the above-indentified patent and that said Letters Patent is hereby corrected as shown below:

Column 14, line 28; change "input" to ---first---.

Signed and Sealed this

Twelfth Day of August, 1997

Attest:

BRUCE LEHMAN

Attesting Officer

Commissioner of Patents and Trademarks